US009162306B2

(12) United States Patent
Lin et al.

(10) Patent No.: US 9,162,306 B2
(45) Date of Patent: Oct. 20, 2015

(54) METHOD AND SYSTEM FOR REDUCING OVERSIZED HOLES ON TURBINE COMPONENTS

(75) Inventors: Dechao Lin, Greer, SC (US); Srikanth Chandrudu Kottilingam, Simpsonville, SC (US); Yan Cui, Greer, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 557 days.

(21) Appl. No.: 13/556,384

(22) Filed: Jul. 24, 2012

(65) Prior Publication Data

US 2014/0027410 A1    Jan. 30, 2014

(51) Int. Cl.
  *B23K 9/04*  (2006.01)
  *B23K 9/09*  (2006.01)
  *B23K 9/12*  (2006.01)
  *B23K 9/28*  (2006.01)

(52) U.S. Cl.
  CPC . *B23K 9/048* (2013.01); *B23K 9/09* (2013.01); *B23K 9/126* (2013.01); *B23K 9/287* (2013.01); *B23K 2201/001* (2013.01); *B23K 2203/04* (2013.01); *B23K 2203/08* (2013.01)

(58) Field of Classification Search
  CPC ............ B23K 9/048; B23K 9/09; B23K 9/26; B23K 9/287; B23K 2201/001; B23K 2203/04; B23K 2203/08
  USPC .......... 219/69.15, 69.17, 76.13; 427/540, 580
  See application file for complete search history.

(56) References Cited

U.S. PATENT DOCUMENTS

| 3,806,691 | A  | * | 4/1974  | Roach ........................ 219/69.16 |
| 4,721,838 | A  | * | 1/1988  | Abdukarimov et al. ... 219/69.15 |
| 6,234,752 | B1 | * | 5/2001  | Wei et al. ...................... 205/665 |
| 6,417,477 | B1 | * | 7/2002  | Brown et al. ............... 219/76.13 |
| 6,521,301 | B1 | * | 2/2003  | Sekiguchi et al. ............ 427/540 |
| 2001/0027749 | A1 | * | 10/2001 | Kinbara ........................ 118/308 |
| 2004/0140292 | A1 | * | 7/2004  | Kelley et al. ................ 219/76.13 |
| 2004/0182826 | A1 | * | 9/2004  | Bailey et al. ............... 219/76.13 |
| 2008/0085395 | A1 | * | 4/2008  | Fernihough et al. .......... 427/596 |
| 2009/0041953 | A1 | * | 2/2009  | Fajardo-Reina et al. ..... 427/580 |
| 2009/0056096 | A1 |   | 3/2009  | Hixson |
| 2009/0200274 | A1 | * | 8/2009  | Forster et al. .............. 219/69.15 |
| 2010/0126871 | A1 | * | 5/2010  | Shiino et al. .................. 205/115 |
| 2012/0193329 | A1 | * | 8/2012  | Liu et al. ..................... 219/76.13 |
| 2014/0017415 | A1 | * | 1/2014  | Lin et al. ...................... 427/580 |
| 2014/0050938 | A1 | * | 2/2014  | Lin et al. ...................... 428/596 |

OTHER PUBLICATIONS

Plasma Jet S.L.R., Electro-Spark Deposition (ESD) process, available online at http://www.plasmajet.ro/en/content/electro-spark-deposition, downloaded Feb. 14, 2012.

Price, Norma, Results of materials testing for ElectroSpark Deposition, Advanced Surfaces & Processes, Inc., Forest Grove, OR, www.advanced-surfaces.com, Jan. 26, 2006.

(Continued)

*Primary Examiner* — Geoffrey S Evans
(74) *Attorney, Agent, or Firm* — McNees, Wallace & Nurick LLC

(57) ABSTRACT

A system is disclosed for reducing an internal diameter of a hole in a metal substrate. The system includes an electrospark device having an electrospark torch and an electrode holder rotatable about an axis. An electrode is removably supported in the electrode holder. The electrospark device configured to apply a coating of a material of which the electrode is formed, to the substrate on an inner wall of the hole when the electrode is rotated within the hole.

17 Claims, 2 Drawing Sheets

(56) References Cited

OTHER PUBLICATIONS

Aoshima, Shoju, Electro-Spark Process for Repair and Maintenance of Die-Casting Dies, available online at URL: technocoat.co.jp, TechnoCoat International, Japan, downloaded Feb. 14, 2012.

Lambert, M.J., Summary of Dissimilar Metal Joining Trials Conducted by Edison Welding Institute, Bechtel Bettis, Inc., West Mifflin, PA, Materials Technology Information Brief, 76 pages, Nov. 18, 2005.

Price, Norma, ElectroSpark Deposition studies for gas turbine engine component repair, Advanced Surface and Processes, Inc., HCAT Program Review Meeting, Greensboro, NC, Mar. 17, 2005.

Gould, J., Application of Electro-Spark Deposition as a Joining Technology, Welding Journal, vol. 90, Issue Oct. 2011, pp. 191s-197s.

Aylor, Denise M., Electrospark Deposition for U.S. Navy Component Repair Applications, HCAT Meeting San Diego, CA, Jan. 2006, NSWC Carderock Division, West Bethesda, MD.

Pallos, K.J., GE Power System, GER-3957B, Gas Turbine Repair Technology, GE Energy Services Technology, Atlanta, GA, Apr. 2001, 26 pages.

* cited by examiner

METHOD AND SYSTEM FOR REDUCING OVERSIZED HOLES ON TURBINE COMPONENTS

BACKGROUND OF THE INVENTION

The application generally relates to sizing of cooling holes on turbine components. The application relates more specifically to an electrospark deposition (ESD) process for reducing oversized holes in gas turbine engine components.

Electrospark deposition (ESD) is a pulsed-arc, microwelding process that uses short-duration, high-current electrical pulses to deposit a consumable electrode material on a conductive workpiece. ESD processes generally involve very high spark frequencies with the spark duration lasting only a few microseconds. ESD generally requires manual control or preprogramming of the process parameters. Significantly, depositions result in very little heat input because heat is generated during less than 1% of a weld cycle and dissipated during 99% of the cycle. ESD coatings are extremely dense and metallurgically bonded to the workpiece. Conventional electrospark deposition devices employ an electrode rod, which is required to have a sharp tip for generating electrical discharges or sparks. When using conventional ESD devices it is difficult to repair or build up confined surfaces such as an inner diameter of a hole in a metal part.

Many component parts of a gas turbine engine include cooling holes for active cooling of engine sections located downstream of the turbine section. The rising combustor exit temperatures in gas turbine engines necessitate active cooling to avoid thermal failure. In some parts of the gas turbine engine, hole dimensions are not as important, but cooling hole configurations may be critical on such parts as buckets, vanes, shrouds and nozzles, for example.

In manufacturing gas turbine component parts, drilling and machining operations may on occasions result in cooling holes being larger than specified, e.g., when an incorrect hole diameter is used when setting up the tooling, or when an operator error occurs during manufacturing. When a hole drilled in an engine component is too large, the component may not pass inspection, and will be returned for quality control reasons for correction. Currently, repair of oversized holes may be a costly and time consuming project, and may not be possible at all, resulting in the loss of valuable engine parts. Oversizing of holes can occur during turbine operation due to erosion, oxidation, and other operational conditions.

Currently, one solution for dealing with oversized cooling holes in engine components is to weld the oversized holes until they are closed, and machine new cooling holes in the engine component using electrode discharge machining (EDM) process. EDM is a process whereby material is removed from the workpiece by a series of rapidly recurring current discharges between an electrode and the workpiece, separated by a dielectric liquid and subject to an electric voltage.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

BRIEF DESCRIPTION OF THE INVENTION

The disclosed method is an ESD process using a rotary electrode. A ceramic tube spacer is placed around a portion of the electrode to maintain the desired length of electrode positioned in the hole constant during the ESD process. The ceramic tube spacer also protects the top surface adjacent the cooling holes from being damaged, e.g., by heat, during the ESD process. Selection of the electrode material depends on the substrate material.

One embodiment relates to a method of reducing an internal diameter of a hole in a metal substrate. The method includes the steps of providing the metal substrate having a hole penetrating the metal substrate; providing an electrospark deposition device, the ESD device configured to receive a rotary electrode supported axially in the ESD device; centering the electrospark torch over the hole in the substrate; inserting the rotary electrode into the hole to a predetermined length below a top surface of the metal substrate; maintaining constant the predetermined length of insertion of the rotary electrode in the hole; applying the electrode disk to the substrate on an inner surface of the hole; rotating the rotary electrode in contact with an inner wall of the hole; applying an electrospark process; and depositing an alloyed coating on at least a portion of the inner wall along the inner wall to reduce the diameter of the hole by a thickness of the coating.

Another embodiment relates to a system for reducing an internal diameter of a hole in a metal substrate. The system includes an electrospark device having an electrospark torch and an electrode holder rotatable about an axis. An electrode is removably supported in the electrode holder. The electrospark device configured to apply a coating of a material comprising the electrode to the substrate on an inner wall of the hole when the electrode is rotated within the hole.

An advantage of the present disclosure is an electrospark deposition process that is simple to operate; characterized by low heat input; flexible, e.g., with respect to electrode length which depends on the application.

Another advantage is that the repair process may be completed without the use of EDM, as only slight grinding of the repaired site is sufficient to finish the substrate.

Alternative exemplary embodiments relate to other features and combinations of features as may be generally recited in the claims.

DETAILED DESCRIPTION OF THE INVENTION

The ESD process is known to have a very low heat input. The ESD transfers stored energy to a consumable electrode, e.g., carbides (W, Ti, Cr etc) stainless steel, nickel alloys, cobalt alloys, aluminum, and other electrode compositions. The temperature on the tip of the electrode may be in a range of about 8000 to about 25000° C. The electrode material is ionized and transferred to the substrate surface, producing an alloy with the substrate and a deposition on the alloyed electrode-substrate interface. The deposited layer adheres metallurgically on the alloyed substrate and electrode material.

Figure 1:
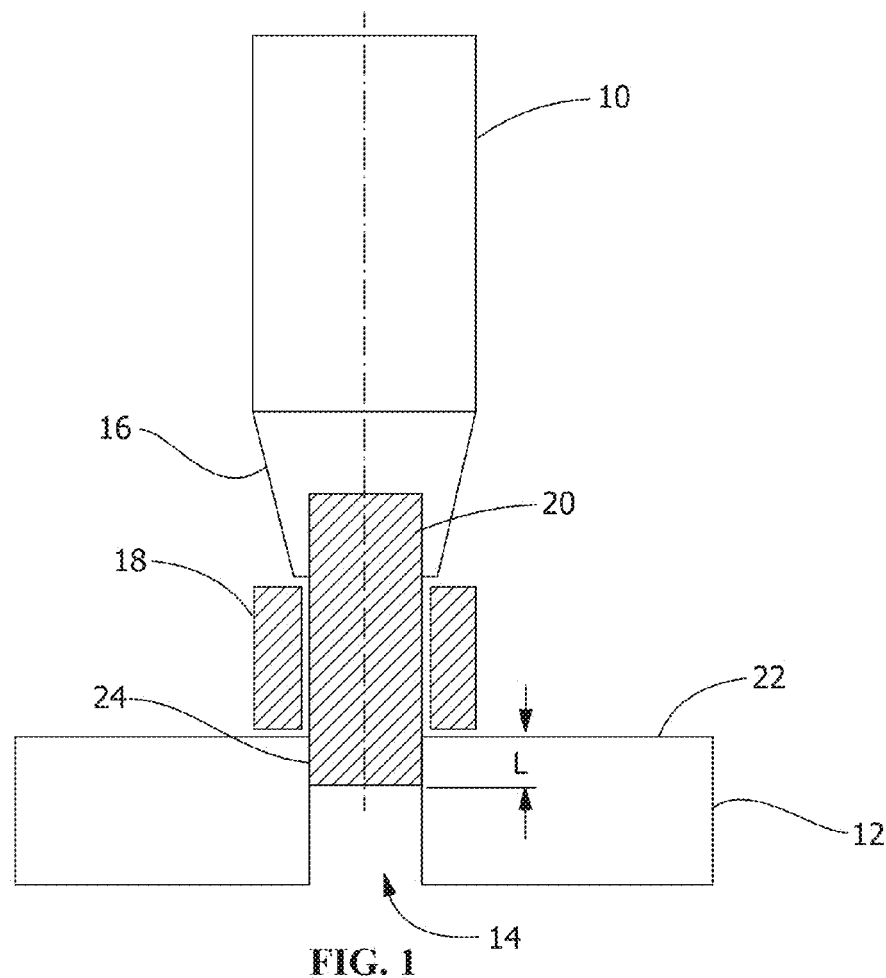
FIG. 1 is a schematic diagram of an ESD process for reducing an oversized hole in a substrate.

Referring to FIG. 1, an exemplary arrangement for an ESD process for reducing an internal diameter of a hole is shown. An electrospark torch 10 is positioned over a substrate 12, and centered over a hole 14 through the substrate 12. Electrospark torch 10 may be supported by a robotic frame or other conventional mounting frame (not shown). At one end electrospark torch 10 includes a rotary electrode holder 16 configured to hold a consumable electrode 20. Electrode 20 is supported axially within rotary electrode holder 16. A cylindrical ceramic tube spacer 18 having a hollow bore is positioned above hole 14 on substrate 12, substantially coaxial with the hole. Electrode 20 is inserted through hollow bore of the ceramic tube spacer 18 and into hole 14. Electrode 20 may penetrate partially or completely through the thickness of substrate 12. The length L, indicated by arrows, indicates the length of electrode 20 penetrating into hole 14 below substrate top surface 22. Ceramic tube spacer 18 acts as a spacer between electrode holder 16 and substrate top surface 22, to ensure that the length L of electrode 20 in hole 14 remains constant throughout the ESD operation. Length L may be adjusted for different applications, e.g., different substrate materials, substrate thicknesses and hole sizes.

Electrospark torch 10 deposits a coating of electrode material from electrode 20 along an inner wall 24 of hole 14. The deposited coating of electrode material reduces the inner diameter of hole 14, using the ESD process.

Figure 2:
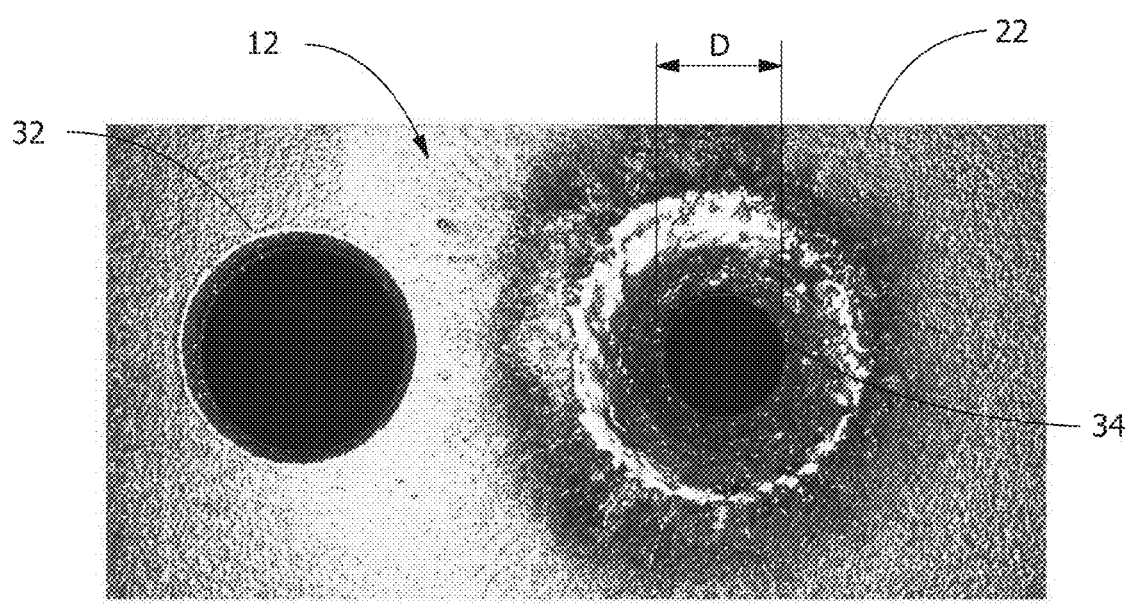
FIG. 2 is a photograph of an oversized hole and an adjacent hole reduced by the ESD process of the present disclosure, adjacent to an oversized hole.

Referring to FIG. 2, an exemplary test substrate is shown. In the example test plate, a pair of holes 32, 34 were originally drilled with a diameter of 0.117" representing an oversized diameter. Hole 34 was then reduced by the ESD process described above. The inside diameter D of the reduced hole 34 after ESD is 0.0710", indicating that the hole diameter has been reduced by 0.046" overall from the original diameter of 0.117". The repair site on the top surface 22 of substrate 12 was then ground to remove any surface irregularities caused by the ESD process, to leave a substantially smooth finish. The hole diameter may be reduced by the ESD process in the range of 0.001" to 0.100", for example, the deposition thickness depending on the length of time the ESD process is applied.

Figure 3:
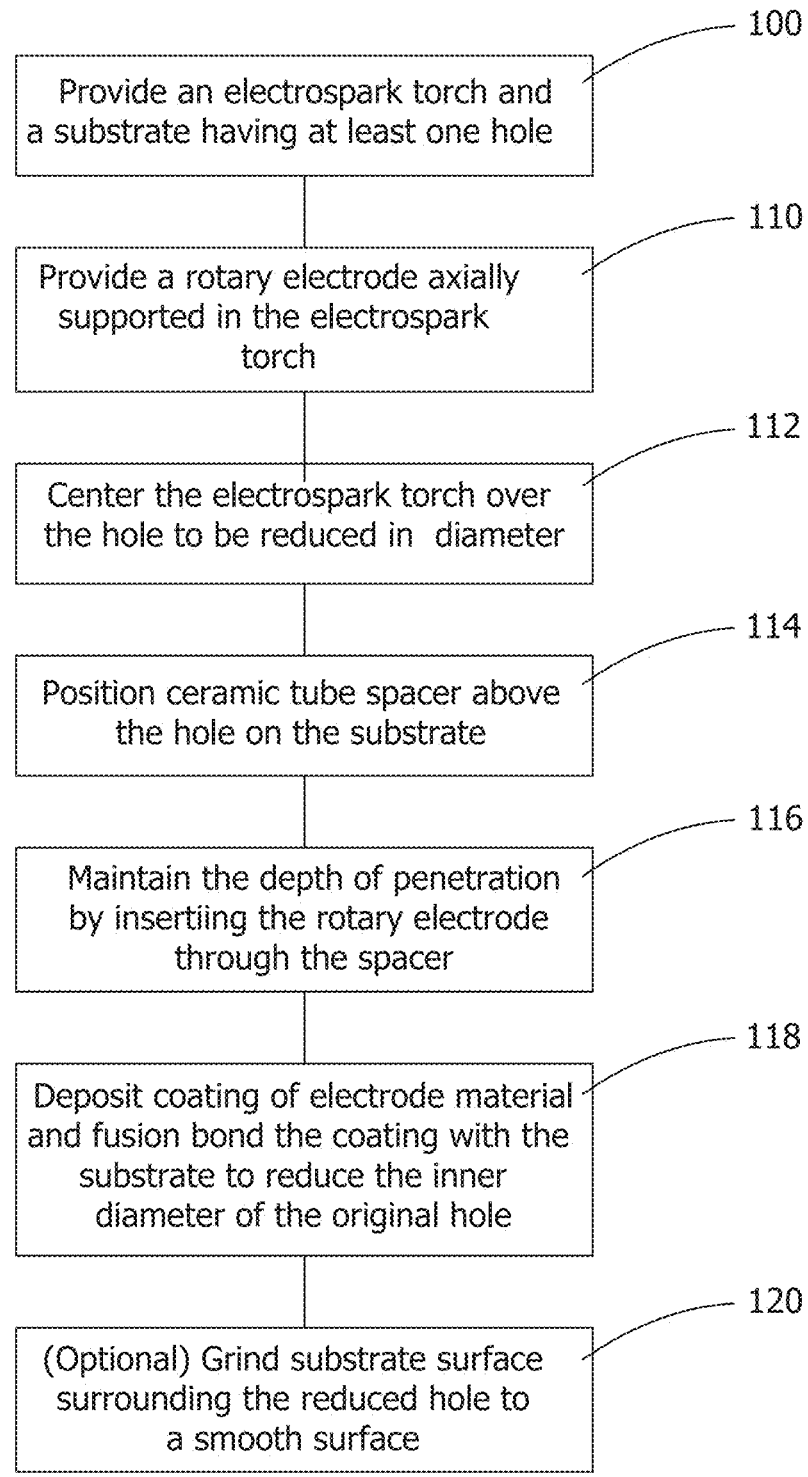
FIG. 3 is a flow diagram of an ESD hole reduction process, according to an embodiment of the present disclosure.

Referring next to FIG. 3, a flow diagram of the disclosed ESD hole reduction process is shown. The method begins at step 100, by providing an electrospark torch configured for a rotary electrode, and a substrate having at least one hole therethrough. At step 110, the method proceeds by holding a consumable rotary electrode in the electrospark torch, with the rotary electrode axially supported within an electrode holder. Next at step 112, the method proceeds by centering the electrospark torch over the hole through the substrate, which hole is to be reduced in diameter. Next at step 114, a hollow ceramic tube spacer is positioned above the hole on the substrate. At step 116, the depth of penetration of the substrate by the rotary electrode is maintained constant by inserting the rotary electrode through the ceramic tube spacer, which provides a predetermined space between the electrode holder and the substrate top surface throughout the ESD operation. Then at step 118, the method proceeds with the ESD to deposit an alloyed coating of electrode material and fusion bonding the deposited coating with the substrate at the inner wall of the hole to reduce the inner diameter of the original hole. Finally, at step 120, the electrospark torch and associated electrode and ceramic tube spacer are removed and, optionally, the substrate surface surrounding the reduced hole is ground down to a smooth surface.

Substrate 12 may be any metal used in turbine components. In particular, the materials used for substrate 12 may include carbon steels, low alloy steels, stainless steels (martensitic, ferritic austenitic and precipitation hardened), solid solution nickel/cobalt base alloys such as INCONEL® 617, INCONEL® 625, Hastelloy X, HAYNES® 25, HAYNES® 188 and similar Ni/Co alloys, Precipitation hardened superalloys such as, for example, GTD111, GTD444, Rene 108, Rene N4, Rene N5, FSX414 (trademarks of GE Corporation) and similar superalloys; wear resistant alloys such as TRIBALOY® (T800), various stellites, and similar wear resistant alloys; and titanium alloys. "INCONEL" is a federally registered trademark of alloys produced by Huntington Alloys Corporation, Huntington, W. Va. "HAYNES" and "HASTELLOY" are federally registered trademarks of alloys produced by Haynes International, Inc., Kokomo, Ind., "TRIB-ALOY" is a federally registered trademark of alloys produced by Deloro Stellite Holdings Corporation, St. Louis, Mo.

In one embodiment, the substrate may have a composition, by weight, of about 14% chromium, about 9.5% cobalt, about 3.8% tungsten, about 1.5% molybdenum, about 4.9% titanium, about 3.0% aluminum, about 0.1% carbon, about 0.01% boron, about 2.8% tantalum, and a balance of nickel.

In another embodiment, the substrate may have a composition, by weight, of about 9.75% chromium, about 7.5% cobalt, about 3.5% titanium, about 4.2% aluminum, about 6.0% tungsten, about 1.5% molybdenum, about 4.8% tantalum, about 0.08% carbon, about 0.009% zirconium, about 0.009% boron, and a balance of nickel.

In another embodiment, the substrate may have a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, about 0.01% yttrium, and a balance of nickel.

In another embodiment, the substrate may have a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance of nickel.

In another embodiment, the substrate may have a composition, by weight, of about 5% iron, about 20% to about 23% chromium, about 0.50% silicon, about 8% to about 10% molybdenum, about 0.50% manganese, about 0.10% carbon and a balance nickel.

In another embodiment, the substrate may have a composition, by weight, of about 20% to about 24% chromium, about 10% to about 15% cobalt, about 8% to about 10% molybdenum, about 0.8% to about 1.5% aluminum, about 0.05% to about 0.15% carbon, about 3.0% iron, about 1.0% manganese, about 0.015% silicon, about 0.015% sulfur, about 0.6% titanium, about 0.5% copper, about 0.006% boron and a balance nickel.

In another embodiment, the substrate may have a composition, by weight, of about 16.5% to about 18.5% chromium, about 1.5% nickel, about 3% iron, about 27% to about 30% molybdenum, about 0.08% carbon, about 0.07% nitrogen, about 0.05% oxygen, about 3.0% to about 3.8% silicon, about 0.03% phosphorus, about 0.03% sulfur and a balance cobalt.

In one embodiment, the substrate has a composition, by weight, of about 0.07-0.10% carbon, about 8.0-8.7% chromium, about 9.0-10.0% cobalt, about 0.4-0.6% molybdenum, about 9.3-9.7% tungsten, about 2.5-3.3% tantalum, about 0.6-0.9% titanium, about 5.25-5.75% aluminum, about 0.01-0.02% boron, about 1.3-1.7% hafnium, about 0.1% maximum manganese, about 0.06% maximum silicon, about 0.01% maximum phosphorus, about 0.004% maximum sulfur, about 0.005-0.02% zirconium, about 0.1% maximum niobium, about 0.1% maximum vanadium, about 0.1% maximum copper, about 0.2% maximum iron, about 0.003% maximum magnesium, about 0.002% maximum oxygen, about 0.002% maximum nitrogen, and a balance nickel and incidental impurities.

In another embodiment, the substrate may have a composition, by weight, of about 10% nickel, about 29% chromium, about 7% tungsten, about 1% iron, about 0.25% carbon, about 0.01% boron and a balance cobalt.

In another embodiment, the substrate may have a composition, by weight, of about 22% chromium, about 18% iron, about 9% molybdenum, about 1.5% cobalt, about 0.6% tungsten, about 0.10% carbon, about 1% manganese, about 1% silicon, about 0.008% boron and a balance nickel.

In another embodiment, the substrate may have a composition, by weight, of about 20% chromium, about 15% tungsten, about 10% nickel, about 3% iron, about 1.5% manganese and a balance cobalt.

In another embodiment, the substrate may have a composition, by weight, of about 0.015% boron, about 0.05% to about 0.15% carbon, about 20% to about 24% chromium, about 3% iron, about 0.02% to about 0.12% lanthanum, about 1.25% manganese, about 20% to about 24% nickel, about 0.2% to about 0.5% silicon, about 13% to about 15% tungsten, and a balance cobalt.

It should be understood that the application is not limited to the details or methodology set forth in the following description or illustrated in the figures. It should also be understood that the phraseology and terminology employed herein is for the purpose of description only and should not be regarded as limiting.

It is important to note that the construction and arrangement of the ESD system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The invention claimed is:

1. A method of reducing an internal diameter of a hole in a metal substrate comprising:
   providing the metal substrate having a hole penetrating the metal substrate;
   providing an electrospark deposition (ESD) device, the ESD device configured to receive a rotary electrode supported axially in the ESD device;
   centering the electrospark torch over the hole in the substrate;
   inserting the rotary electrode into the hole to a predetermined length below a top surface of the metal substrate;
   maintaining constant the predetermined length of insertion of the rotary electrode in the hole;
   applying the electrode to the substrate on an inner surface of the hole;
   rotating the rotary electrode in contact with an inner wall of the hole;
   applying an electrospark process; and
   depositing an alloyed coating on at least a portion of the inner wall along the inner wall to reduce the diameter of the hole by a thickness of the coating.

2. The method of claim 1, further comprising repeating the previous step of depositing an alloyed coating until a desired coating thickness is obtained.

3. The method of claim 1, further comprising finishing the top surface of the substrate adjacent the hole to provide a substantially smooth surface comparable to the top surface prior to applying the ESD device.

4. The method of claim 1, wherein the coating thickness is about 0.023" inches.

5. The method of claim 1, wherein the diameter of the hole is reduced by about 0.046".

6. The method of claim 1, further comprising forming a metallurgical bond between the substrate and the alloyed coating on an inner surface of the hole.

7. The method of claim 6, wherein the rotary electrode comprises an electrode material suitable for forming a metallurgical bond with the substrate.

8. The method of claim 1, wherein the step of maintaining the predetermined length of insertion of the rotary electrode in the hole comprises inserting the rotary electrode through a ceramic tube spacer.

9. The method of claim 8, further comprising positioning the ceramic tube spacer substantially coaxially with the hole in contact with the top surface of the substrate.

10. A system for reducing an internal diameter of a hole in a metal substrate comprising:
   an electrospark device comprising an electrospark torch and an electrode holder rotatable about an axis, wherein the electrospark device is positioned over the substrate and the electrode centered at least partially inside the hole, the electrospark device inducing a spark to metallurgically bond a coating on an inner wall of the hole to reduce the size of the hole;
   an electrode removably supported in the electrode holder, wherein the electrode includes a consumable rotary electrode, the rotary electrode supported coaxially with the electrospark torch within electrode holder and the hole; and a spacer positioned on a top surface of the substrate concentric and substantially coaxial with the hole, the spacer comprising a hollow bore for receiving the electrode;

the electrospark device configured to apply a coating of a material comprising the electrode to the substrate on an inner wall of the hole when the electrode is rotated within the hole.

11. The system of claim 10, wherein the spacer comprises a ceramic tube spacer.

12. The system of claim 10, wherein the electrospark device is rotatably supported within a robotic frame.

13. The system of claim 10, wherein the electrode is insertable into the hole through the spacer.

14. The system of claim 13, wherein the electrode is arranged to penetrate into the hole below the top surface of the substrate at least a portion of a thickness of the substrate.

15. The system of claim 10, wherein the electrode penetrates the hole by a predetermined length below substrate top surface.

16. The system of claim 15, wherein the substrate is a metal selected from the group comprising: carbon steels, low alloy steels, martensitic, ferritic, austenitic and precipitation hardened stainless steels, solid solution nickel/cobalt base alloys, precipitation hardened superalloys, wear resistant alloys, stellites; and titanium alloys.

17. The system of claim 15, wherein the spacer is disposed between the electrode holder and the top surface maintain the predetermined length of the electrode in the hole.

* * * * *